United States Patent [19]
Ducloux et al.

[11] Patent Number: 6,148,107
[45] Date of Patent: *Nov. 14, 2000

[54] QUANTIZATION PROCESS FOR VIDEO ENCODING

[75] Inventors: Xavier Ducloux, Rennes; Philippe Guillotel, Vern sur Seiche; Ludovic Noblet, Héric; Pierre Ruellou, Rennes, all of France

[73] Assignee: Thomson multimedia S.A., Boulogne Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,656

[22] Filed: Aug. 18, 1997

[30] Foreign Application Priority Data

Sep. 6, 1996 [FR] France ................... 96 10878

[51] Int. Cl.$^7$ ...................................... G06K 9/36
[52] U.S. Cl. ............................. 382/236; 348/405
[58] Field of Search .................... 382/232, 235, 382/239, 251, 253; 358/430; 348/390, 420, 405

[56] References Cited

U.S. PATENT DOCUMENTS

| | | | |
|---|---|---|---|
| 5,144,424 | 9/1992 | Savatier | 358/133 |
| 5,231,484 | 7/1993 | Gonzales et al. | 348/405 |
| 5,650,860 | 7/1997 | Uz | 382/239 |

FOREIGN PATENT DOCUMENTS

| | | | |
|---|---|---|---|
| 0 479 510 A2 | 4/1992 | European Pat. Off. | G06F 15/64 |
| 0 514 663 A2 | 11/1992 | European Pat. Off. | H04N 7/133 |
| 0 534 504 A2 | 3/1993 | European Pat. Off. | H04N 7/137 |
| 0 541 302 A2 | 5/1993 | European Pat. Off. | H04N 7/13 |

OTHER PUBLICATIONS

Cho, et al., "A Region–Based Adaptive Perceptual Quantization Technique for MPEG Coder", IEICE Trans. Inf. & Syst., vol. E79–D, No. 6, Jun. 1996, pp. 737–742.
Keesman, et al., "Bit–Rate Control for MPEG Encoders", Signal Processing:Image Communication, No. 6, Feb. 1995, pp. 545–560.

Primary Examiner—Jose L. Couso
Assistant Examiner—Anh Hong Do
Attorney, Agent, or Firm—Joseph S. Tripoli; Eric P. Herrmann; Ronald H. Kurdyla

[57] ABSTRACT

A block based signal compression system, as for example for coding video signal, and employing quantization of codewords or transform coefficients includes circuitry for adaptively controlling the quantization. Adaptivity of quantization is made a function of several parameters. One parameter is coding cost or bandwidth, wherein coding cost is generated on a macroblock basis but averaged over a window of macroblocks centered on a macroblock currently to be quantized. Another parameter is block or macroblock motion attributes, wherein block motion attribut values are used to modify the quantizing function.

5 Claims, 3 Drawing Sheets

QUANTIZATION PROCESS FOR VIDEO ENCODING

The invention relates to a quantizing method for video coding, which quantization is generally utilized during data compression.

BACKGROUND OF THE INVENTION

As is know, data compression methods effect division of the picture into picture blocks, a discrete cosine transform of these blocks to provide macroblocks of luminance and chrominance coefficients, quantization of these coefficients and variable-length coding.

Intra-type coding uses only the intrinsic content of the picture, according to the method described above.

Inter-type coding estimates the motion between, for example, the preceding picture and the current picture in order to provide motion compensation of the preceding picture, thus providing a predicted picture, the coding then being carried out on the difference between the current picture and the predicted picture.

The cosine transform allows removal of the spatial redundancy and motion compensation removal of the temporal redundancy.

It is known to slave the quantization step to the data rate of the coder in order to control this rate. The algorithms employed are generally targeted at obtaining the lowest possible rate for an optimum picture quality while taking into account the objective coding costs.

For a given rate, improving the picture quality entails removing the spatial and temporal redundancies. Algorithms of this type encounter a problem inherent in the type of coding, the appearance of defects referred to by the term block effects. Since the quantization step differs from one block to another, the decompressed picture may show the boundaries of the picture blocks, even more so if the compression factor is high and the discrepancies between quantization steps of successive macroblocks are therefore great.

The object of the present invention is to limit the aforementioned drawbacks by optimizing the control algorithm, that is to say by improving the picture quality for a given transmission rate.

To this end, the invention relates to a method for data compression of a video picture, comprising division of the current picture into macroblocks and quantizing of the data in each macroblock by calculating a quantization step as a function of a set rate, characterized in that the calculated quantization step is corrected as a function of the coding cost of the macroblock.

It also relates to a method for data compression of a video picture, comprising division of the current picture into macroblocks and quantizing of the data in each macroblock by calculating a quantization step as a function of a set rate, characterized in that the calculated quantization step is corrected as a function of an estimated or calculated motion of the macroblock of the current picture with respect to the matched one of a preceding or following picture.

It also relates to devices implementing the methods.

The spectator's eye is less sensitive to block effects for image zones in movement, because of the eye integration phenomenon. It is also less sensitive to block effects for non-uniform zones, since such uniformity or "regularity" in the picture exaggerates the aforementioned defects.

SUMMARY OF THE INVENTION

The idea of the invention is to adapt the picture quantization method by taking these subjective picture perception criteria into account. The quantization step is reduced for the zones which are uniform and/or stationary or with very little movement, and these are thus coded better. The variation in the quantization step from one macroblock to another for zones of this type is therefore less. The quantization step for coding zones which are not homogeneous and/or are in movement is, for its part, increased in order to keep the same rate allocation for the picture.

Filtering carried out on the quantization corrections in the picture zone surrounding the macroblock which is processed makes it possible to limit the transitions so that, in terms of decompressed picture quality, the coding result appears subjectively homogeneous. The decompressed picture quality is thus improved without increasing the average rate.

Other characteristics and advantages of the present invention will emerge on reading the following description of preferred embodiments of the invention, which are given by way of illustration and without implying any limitation, and the appended drawings, in which:

BRIEF DESCRIPTION OF THE DRAWING

FIG. 2$b$ represents two motion vectors of a P-type frame;

DETAILED DESCRIPTION

As indicated above, a picture to be coded is divided into picture blocks constituting macroblocks.

According to the invention, each macroblock (n,i,j) corresponding to the row i and the column j of the macroblocks of the picture n of an input video sequence is coded by using a quantization step adapted locally according to the following formula:

$$Q[n][i][j] = Q[n][i] \cdot \alpha_{w/p}[n][i][j] \cdot \beta_{2w/p}[n][i][j]$$

$Q[n][i]$ is the quantization step calculated for the "slice" i of picture n, using the standard MPEG nomenclature. The adjustment coefficient $\alpha_{w/p}(n)(i)(j)$ is calculated on the basis of spatial characteristics of the coded sequence and, in particular, the coding cost of the macroblocks, and the coefficient $\beta_{2w/p}(n)(i)(j)$ is calculated on the basis of temporal characteristics of the coded sequence, in particular the motion assigned to the macroblocks, as explained further on.

Calculation of the spatial adjustment coefficient:

This coefficient is directly linked with the intra coding cost of the picture.

The coding cost $\alpha(n)(i)(j)$ of a macroblock (n,i,j) is generally determined during preanalysis of the picture, which consists in coding the picture with a constant quantization step and in measuring the rate generated by the macroblock. In order to attenuate the effects of transition from one zone of given spatial characteristics to another, this value, corresponding to the coding cost, is then filtered in a window of size w around the macroblock. It is thus possible to attenuate sharp variations in the quantization step of neighbouring macroblocks, which would indeed take place on the boundaries when passing from one type of zone to another, for example from a uniform zone to a textured zone, and which would result in edge effects, similar to the block effects but limited to these boundaries. The block effects in the zone are commensurately attenuated.

Figure 1:
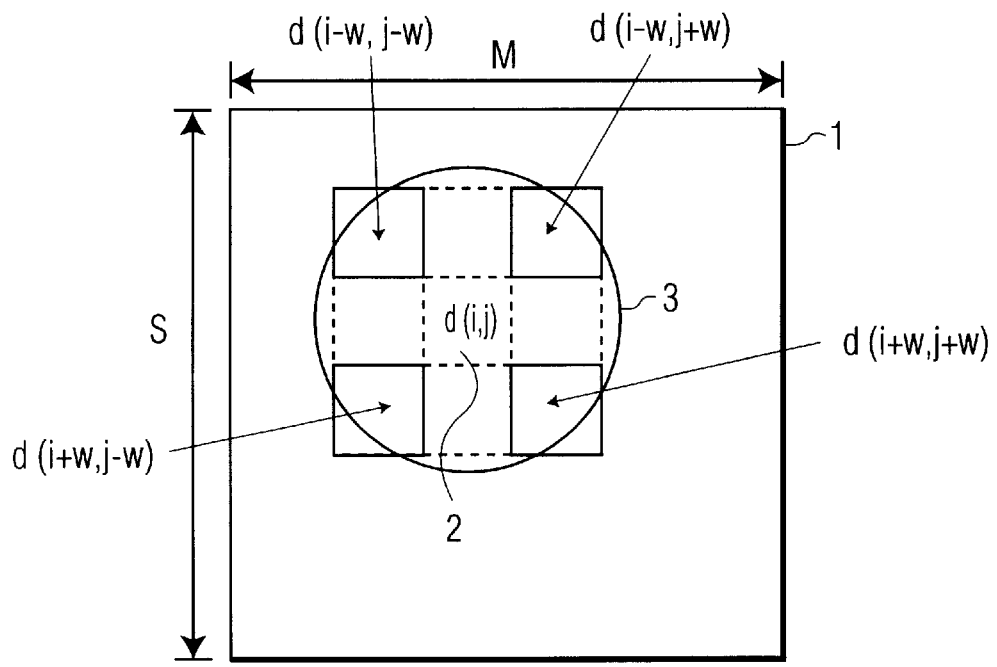
FIG. 1 represents a macroblock and its filtering window in a picture.

FIG. 1 represents a window of this type.

The complete picture 1 consists of M macroblocks per slice and of S slices.

For a given macroblock 2 (n,i,j), lying at the ith slice and jth macroblock column of the picture n, a window 3 of size 2 is defined, taking into account the neighbouring macroblocks at a distance less than or equal to w from the macroblock in question, that is to say the macroblocks belonging both to the slices contained between i−w and i+w and to the columns contained between j−w and j+w. w therefore corresponds to the excursion around the macroblock which is processed.

The coding cost $\alpha(n)$ (i) (j) is averaged over the window W by applying the following formula:

$$\alpha_w(n, i, j) = \frac{1}{(2W+1)^2} \sum_{u=i-w}^{i+w} \sum_{v=j-w}^{j+w} \alpha(n, u, v)$$

In order for the correction of the quantization steps not to invalidate the calculations of the step as a function of the set average rate, that is to say the conventional control algorithms, the correction coefficient averaged over the window of size w, $\alpha_w$, is weighted over the complete picture through dividing it by the average value of the coefficient $\alpha$ over the complete picture, $\alpha_p$.

$$\alpha_p(n) = \frac{1}{M \cdot S} \sum_{u=1}^{S} \sum_{v=1}^{M} \alpha(n, u, v)$$

The spatial coefficient then assumes the following value, for a macroblock (n,i,j):

$$\alpha_{w/p}(n, i, j) = \frac{\alpha_w(n, i, j)}{\alpha_p(n)}$$

The image n can be represented by a matrix of S rows and P columns, the matrix coefficient at row i and column j corresponding to $\alpha_{w/p}(n,i,j)$. This matrix Sp is calculated on the basis of the coding cost matrix of the macroblocks of the picture n, which is obtained during the first intra coding pass for this picture n. This matrix of intra coefficients is referred to as a correction mask, each coefficient in the matrix being applied to the corresponding macroblock in order to correct the quantization step calculated by the conventional compression algorithms during the coding of this macroblock.

Since the sum of the coefficients $\alpha_{w/p}(n,i,j)$ over a picture n is equal to 1, it can be shown that the control algorithm is not interfered with by applying this spatial coefficient to the quantization step.

The calculated coefficients are bounded in order to avoid excessive corrections which may be linked with the control algorithms used and which, to conform with the set rate, may force the quantization step without taking the complexity of the picture into account, for example when coding the last slices of a picture. In our example, the coefficients are forced in a zone which extends from 0.67 to 1.5.

Calculation of the temporal adjustment coefficient:

In order to have a better quality of coding for the zones with little motion compared to the zones with a great deal of motion, it is necessary to detect these zones, which is done by recovering quantity of motion information.

The types of motion vectors available for each macroblock of a picture depend on the type of image (to which this macroblock belongs). The type of image, defined in the MPEG standard, depends on the coding of the image, namely type I, or intra, for intra picture coding, type P, or predictive, for picture coding which only takes into account previous picture references, and type B, or bi-directional, for picture coding which takes into account previous and/or subsequent picture references.

These vectors can therefore be:

for P-type pictures, picture vectors referenced to the preceding intra or P-type picture;

for B-type pictures, forward or backward picture vectors, depending on whether they are referenced to a preceding picture or a subsequent picture.

If the processing is carried out on the picture frames and not on the reconstructed pictures, the calculated vectors are referenced to the frames rather than to the pictures. The available frame vectors are therefore frame vectors with the same parity or with opposite parities.

All these vectors are obtained by block matching. The vectors are calculated by a motion estimator.

The information taken into account for calculating the temporal adjustment coefficients is the norm or modulus of the picture motion vectors.

$$V[n][i][j] = \sqrt{V_{x^2[n][i][j]} + V_{y^2[n][i][j]}}$$

Vx and Vy being the horizontal and vertical components of the motion vector.

This modulus information is then normalized as a function of the number of pictures separating the current picture from the reference picture used to calculate the motion field of the current picture, or of the number of frames separating the current frame from the reference frame, if the calculation is carried out at the frame level, this being in order to obtain a vector field which is perfectly homogeneous over the entire sequence.

The normalized vector is written:

$$V'[n][i][j] = \eta V[n][i][j]$$

$\eta$ being the normalization factor.

The chosen reference period is the one separating two P-type pictures. Let M be the number of picture intervals separating two P-type pictures, and let $B_{pos}$ be the number of intervals separating the B-type picture from the preceding P-type (or I-type) picture, that is to say the position of B between two P pictures.

Figure 2A:
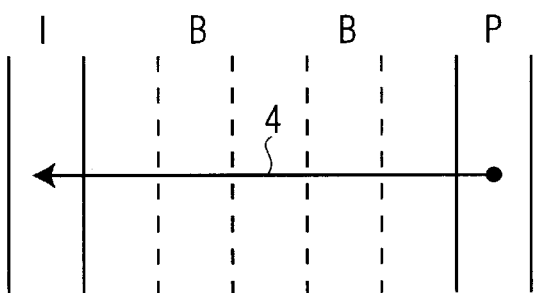
FIG. 2$a$ represents a motion vector of a P-type image.

FIG. 2a represents a vector 4 for a P-type picture. This vector is therefore referenced to the preceding picture I. The gap between the current picture P and the reference picture I corresponds to M.

The normalization factor of a motion vector, when applied to a picture, is written:

when coding a B-type picture with respect to a preceding P-type (or I-type) picture, that is to say for a vector of the forward type:

$$\eta = \frac{M}{B_{pos}}$$

when encoding a B-type picture with respect to a following P-type (or I type) picture, that is to say for a vector of the backward type:

$$\eta = \frac{M}{M - B_{pos}}$$

when coding a P-type picture (the case in FIG. 2a):

η=1

FIG. 2a represents a first motion vector 5 of the first frame of a P-type picture referenced to the second frame of the preceding I-type picture, and a second motion vector 6 of the second frame of the P-type picture, referenced to the first frame of the preceding I-type picture.

Figure 2B:
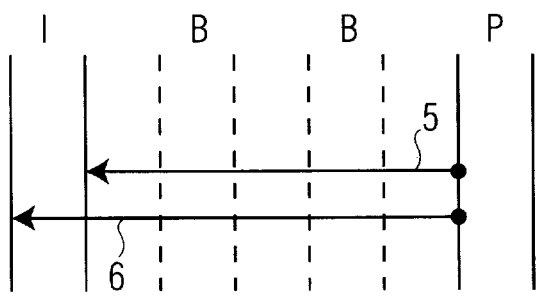

The normalization factor of a motion vector field, when applied to a frame, depends on the field position of the frame and the parity, and is written:

for a P-type frame (the case in FIG. 2b):

$$\eta = \frac{2 \cdot M}{2 \cdot M + [2 \cdot M \cdot (1 - \text{field}) + (-1)^{field}] \cdot \text{parity}}$$

for a B-type frame and forward prediction:

$$\eta = \frac{2 \cdot M}{2 \cdot B_{POS} + (-1)^{field} \cdot \text{parity}}$$

for a B-type frame and backward prediction:

$$\eta = \frac{2 \cdot M}{2 \cdot (M - B_{POS}) - (-1)^{field} \cdot \text{parity}}$$

"field" is equal to 1 or 2 depending on whether the first or second frame in the picture is involved, and parity is equal to 0 or 1 depending on whether the same parity or the opposite parity is involved.

The macroblocks of a picture can be coded on the basis of just forward vectors, just backward vectors or alternatively a combination of the two, in the case of bi-directional type pictures. In this case, those corresponding to the maximum value will be chosen but the averages of the two vectors could equally well be adopted.

The normalized motion vectors V'(n,i,j) are therefore obtained by multiplying the modulus of the motion vectors V(n,i,j) that are assigned to a picture or a frame by the corresponding coefficient η.

The matrix of the temporal adjustment coefficients $\beta_{1w/p}$ (n,i,j) is then calculated by filtering the vectors V' over a window of size W and by weighting over the complete picture, as previously explained for the coefficient .α.

$$\beta_{1w/p}[n][i][j] = \frac{\frac{1}{(2W+1)^2} \sum_{u=i-W}^{i+W} \sum_{v=j-W}^{j+W} V'[n][u][v]}{\frac{1}{M \cdot S} \sum_{u=1}^{S} \sum_{v=1}^{M} V'[n][u][v]}$$

In other words, $\beta_{1w/p}$(n,i,j) corresponds to the average value of the local motion in a window of size W, weighted by the average value of the motion in the picture.

$$\beta_{1w/p}[n][i][j] = \frac{\overline{V'w}[n][i][j]}{\overline{V'p}[n]}$$

$$= 1 - \frac{\overline{V'p}[n] - \overline{V'w}[n][i][j]}{\overline{V'p}[n]}$$

$$= 1 - \lambda_{1w/p}[n][i][j]$$

$\lambda_{1w/p}$(n,i,j), which represents the correction factor of the quantization step, therefore corresponds to the difference between the average value of the motion in the picture, and the local motion value weighted by the average value of the motion in the picture.

The purpose of the correction is to favour the zones with little motion at the cost of those with a high degree of motion. For a lower level of local motion $\overline{V'w}[n][i][j]$ the temporal coefficient (and therefore the quantization step) is less and the quality of the coding of the macroblock corresponding to this local motion is better. Furthermore, because of the fixed rate allocation to a picture, this zone with little motion is coded commensurately better as the average motion in the picture $\overline{V'p[n]}$ increases.

The correction factor fulfils its role perfectly for sequences with a high degree of motion. However, it is bound to be necessary to adjust this coefficient in order to adapt to scenes with little motion as well. An example will allow this point to be illustrated.

Consider a scene with little motion, of the "mobile and calendar" type, a reference which is well-known in the field of data compression. The average motion vector of the picture is 3, a value which is low since the maximum value is of the order of 143 for motion vector coding over 8 bits for the horizontal component and over 7 bits for the vertical component. This value gives a correction factor of 0.33 for a relative motion of a macroblock equal to 1. The correction weight for a zone with little motion, in a sequence which itself has little motion, is therefore much too large.

It can therefore be deduced from this that the corrective coefficient λ1 should be weighted by a factor $$\frac{\overline{V'p[n]}}{\overline{V}},$$

where $\overline{V}$ represents an estimate of the average value of the motion over the image for sequences with a high degree of motion, which amounts to reducing the coefficient λ1 and therefore to attenuating the correction (by letting $\beta_1$ tend to unity) for scenes with little average motion ($\overline{V'p(n)} < \overline{V}$) while maintaining it for scenes with a high degree of motion.

The movement of a pixel of the picture over the total width of the picture during one second has been experimentally defined as a good estimate of $\overline{V}$:

$$\overline{V} = \frac{picture\_width}{F_R} \cdot M$$

"picture_width" is this width expressed as a number of pixels (for example 720), and $F_R$ is the picture frequency (for example 50 Hz).

M makes it possible to normalise the average value (this is therefore the average motion over the reference time distance).

Lastly, the local temporal adjustment coefficient $\beta_{2w/p}(n, i, j)$ can be written:

$$\beta_{2w/p}[n][i][j] = 1 - \lambda_{1w/p}[n][i][j]\frac{V'p[n]}{V} = \frac{(\overline{V} - \overline{V'p[n]}) + \overline{V'w}[n][i][j]}{V}$$

If the expression $V''[n][i][j] = V'[n][i][j] + (\overline{V} - \overline{V'p[n]})$, is used, then:

$$\beta_{2w/p}[n][i][j] = \frac{\overline{V''w}[n][i][j]}{\overline{V}} = \frac{\overline{V''w}[n][i][j]}{\overline{V''p[n]}}$$

In other words, the local temporal adjustment coefficients $\beta_{2w/p}(n,i,j)$ correspond to filtering, over the window of size W, of the normalized vectors V" which are obtained by recentring the normalized vectors V' around the average velocity vector representing the sequences with a high degree of motion.

Lastly, the quantization step of a current macroblock calculated by the conventional control algorithm, is corrected by the overall adjustment coefficient, which is the product $\alpha_{w/p}(n,i,j) \times \beta_{2w/p}(n,i,j)$, taking into account the spatial and temporal complexity of the picture.

The algorithm for calculating the coefficients can be simplified by noting that each of the terms in the product can be calculated with the same operator, which is as follows:

$$\alpha_{w/p}[n][i][j] ou \beta_{2w/p}[n][i][j] = \frac{\frac{1}{(2W+1)^2}\sum_{u=i-W}^{i+W}\sum_{v=j-W}^{j+W} d[n][u][v]}{\frac{1}{M \cdot S}\sum_{u=1}^{S}\sum_{v=1}^{M} d[n][u][v]}$$

For the coefficient $\alpha$, the term d (n), (u), (v) represents the coding cost of the macroblock (n,u,v), and for the coefficient $\beta$, it represents the modulus of the vector V" assigned to the macroblock (n,u,v).

Figure 3:
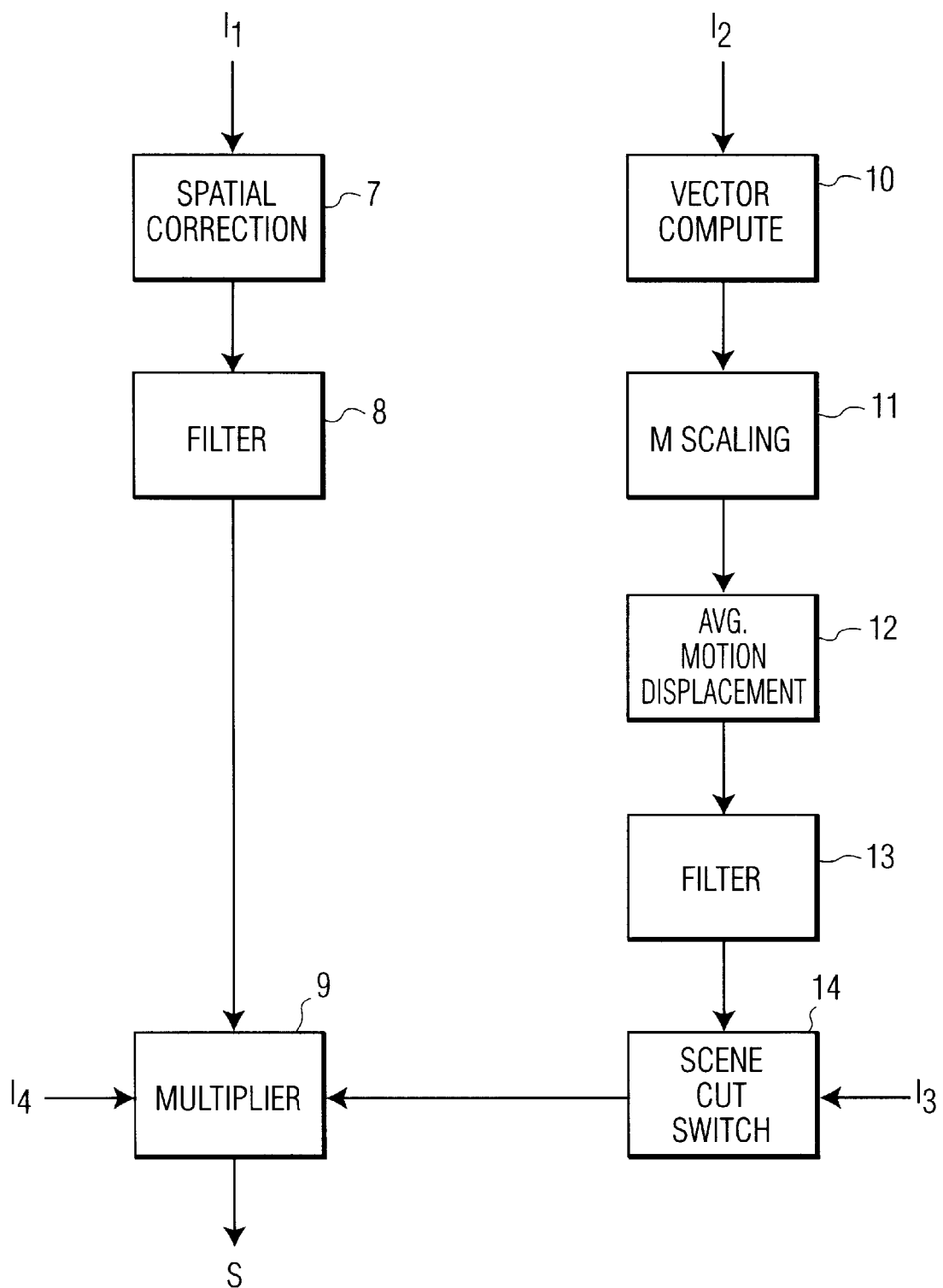
FIG. 3 represents an algorithm of the method according to the invention.

FIG. 3 represents an algorithm for calculating the quantization coefficients.

The step referenced 7 calculates the spatial adjustment coefficients on the basis of information on coding costs of the intra picture blocks that are received on the input I1 and are calculated during a first coding pass, or pre-analysis, of the picture. These coefficients are then filtered in a window of size w during stage 8 to give a matrix of spatial adjustment coefficients which is sent to step 9.

Step 10 calculates the modulus of the picture motion vectors on the basis of the forward and backward vectors which are delivered by the motion estimator and are available on the input I2. The following step 11 scales or normalizes the modulus of these vectors as a function of the position of the corresponding picture in the group of pictures. It calculates the normalization factor η as a function of the value of M assigned to each picture. The following step 12 calculates the average value of the motion over the complete picture, for sequences with a high degree of motion, as are defined above. The normalized vectors are then recentred in step 13 around this average value, then they are filtered over a window of size w. Further to the information originating from step 13, step 14 receives information originating from the input I3, relating to the cuts in the picture sequences. If a "cut" information item is sent for the current picture being processed, step 14 blocks correction of the quantization step as a function of the temporal adjustment coefficient by sending a coefficient matrix equal to 1. In the alternative case, it is the coefficients calculated in the preceding step which are sent in the form of a matrix of temporal adjustment coefficients. Step 9 multiples each temporal adjustment coefficient by the corresponding spatial adjustment coefficient (same row, same column) to give a new matrix of coefficients which, it should be recalled, corresponds to the macroblocks in the picture which is being processed. This step also takes into account the quantization step, sent to input I4, which is the one calculated on the basis of a conventional control algorithm. This quantization step, multiplied by the new coefficient obtained for the current macroblock, gives the new, adjusted quantization step delivered at the output S of step 9.

Figure 4:
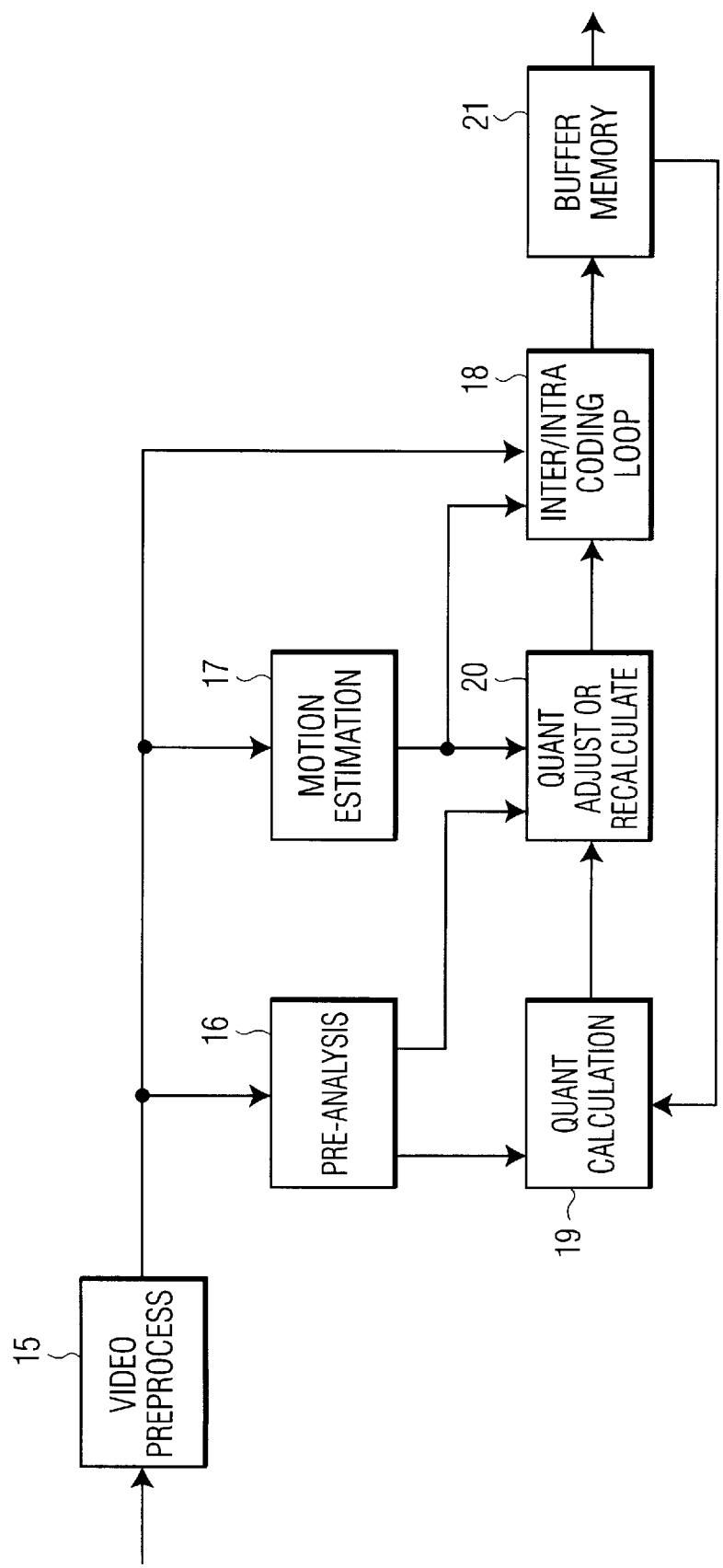
FIG. 4 represents a device according to the invention.

FIG. 4 represents an illustrative embodiment of a device implementing the method described above.

A video pre-processing circuit 15 receives the video information on its input, which is also the input of the device. Its output is connected to the input of a pre-analysis or "first pass" circuit 16, to the input of a motion estimator 17 and to the input of an inter/intra coding loop 18. A first output of the pre-analysis circuit is connected to a first input of a circuit 18 for calculating the quantization step, and a second output of the pre-analysis circuit is connected to a first input of a circuit 20 for adjusting the quantization step. The output of the motion estimator 17 is connected in parallel to a second input of the quantization-step adjustment circuit 20 and to a second input of the inter/intra coding loop 18. On a second input, the quantization-step calculation circuit 19 receives filling information originating from an output buffer or buffer memory 21. The output of the quantization-step calculation circuit 19 is connected to a third input of the quantization-step adjustment circuit 20. The output of this circuit is connected to a third input of the coding loop 18. The output of the coding loop is connected to an output buffer or buffer memory 21, a first output of which is the output of the device and a second output of which is connected to the quantization-step calculation circuit 19.

In conventional fashion, the pre-processing circuit rearranges the pictures at the group of pictures level, as defined in the MPEG standard, then divides the pictures into macroblocks. The pre-analyser performs a first pass, that is to say intra coding of the pictures on the basis of a constant quantization step which is predefined or adjusted as a function of the coding complexity of the preceding pictures of the group of pictures (GOP in the MPEG standard) which is being processed, control being carried out at the GOP level, to provide the quantization-step calculation circuit 19 with a coding cost per picture. The pre-analyser also supplies a coding cost per macroblock to the circuit 20 for locally adjusting the quantization step, in order to calculate the spatial adjustment coefficients. This circuit 20 also receives the motion vectors calculated on the basis of the motion estimator 17 in order to determine the temporal adjustment coefficients. The inter/intra coding loop 18 receives the video information in macroblock form from the pre-processing circuit 15, and receives the motion vectors assigned to each of the macroblocks from the motion estimator, in order to calculate the inter macroblocks. It carries out a discrete cosine transform on the intra or inter macroblocks depending on the inter or intra mode determined by calculating the energy intrinsic to these macroblocks. The coefficients which are obtained are quantized using the adjusted quantization step information sent by the quantization-step adjustment circuit 20. The quantized coefficients are then sent to the buffer memory 21 then to the output of the device. The buffer memory makes it possible to control the output rate of the device. The information relating to the filling of this memory is sent to the quantization-step calculation circuit 19, which also has the information regarding the set output rate of the device. As its name implies, this quantization-step calculating circuit 19 has the role of calculating the quantization step for each picture as a function of this set rate, this rate being generated at the group of pictures level and also of the degree of filling of the buffer memory. This step is then sent to the quantization-step adjustment circuit whose role, amongst other things, is to correct its value as a function of the spatial and temporal adjustment coefficients calculated for the macroblock in question.

Of course, these are illustrative embodiments, and the criterion α may be any coefficient representing the complexity of the picture, for example the energy of the macroblock or the luminance gradient. The same is true for the criterion β, which may be any coefficient giving motion information.

As mentioned above, application of the temporal criterion assumes continuity in the scene which is coded. Thus, during a change of shot, for example detected through the coherence of the motion vectors calculated by the motion estimator (the vector field then being heterogeneous), use of the coefficient β is blocked. The adjustment of the quantization step as a function of the temporal criterion is blocked so as not to impair the supervision algorithm, in particular the conversion rate of this algorithm. During macroblock coding in intra mode (generally associated with this change of shot), the coefficient β is, for example, forced to 1.

The size of the filtering window depends on the desired level of correction for the quantization step: the wider the window, the more the coefficients tend to one. This size can be adapted as a function of the zones which are being processed, that is to say their uniformity and/or their motion, depending on the degree of correction for the quantization step which they need.

Using the same filter to calculate the spatial and temporal correction coefficients does not demand implementation of the same filtering window. As regards the temporal criterion, the filtering window can be reduced to its minimum size when the motion vectors obtained for a macroblock, either of forward type or of backward type, are homogeneous with those obtained for the neighbouring macroblocks.

The method can be adapted to any type of coder which utilizes luminance data quantization, whether in the spatial or frequency domain. The example which is described relates to the coefficients of transformed blocks, but the invention could be applied to the luminance values of the picture blocks.

The method can also be adapted to any type of control algorithm acting on the quantization step. We have assumed that the quantization step was constant for a slice, according the MPEG standard, but the invention could be applied to an alogirthm which calculates one quantization step for each macroblock.

What is claimed is:

1. Method for data compression of a video picture, comprising:

dividing a current picture into macroblocks;

calculating quantizing factors for each macroblock, as a function of a set data rate;

adjusting respective quantizing factors as a function of amplitudes of motion vectors associated with respective macroblocks and as a function of coding cost of the respective macroblocks, to produce adjusted quantizing factors, wherein the coding cost of a macroblock is averaged over a window centered on said macroblock; and quantizing data in each macroblock using said adjusted quantizing factors.

2. Method for data compression of a video picture, comprising:

dividing a current picture into macroblocks;

calculating quantizing values for each macroblock as a function of a set data rate;

modifying a quantizing value as a function of motion information consisting of estimated or calculated motion amplitude of a macroblock of the current picture with respect to a matched macroblock of a preceding or following picture, and corrected by a value corresponding to a difference between average motion estimated for sequences with a high degree of movement and the average motion in the picture to which the macroblock belongs, and wherein macroblock motion is averaged over a window centered on the current macroblock.

3. Method for data compression of a video picture, comprising:

dividing a current picture into macroblocks;

calculating quantizing values for each macroblock as a function of a set data rate;

adjusting said quantizing values for each macroblock as a function of interpicture motion of the macroblock and as a function of the coding cost of the macroblock; and wherein adjusting includes multiplying a quantization value calculated for the macroblock by a spatial adjustment coefficient equal to the coding cost of the macroblock averaged over the window, divided by a coding cost averaged over the complete picture.

4. Method for data compression of a video picture, comprising:

dividing a current picture into macroblocks;

quantizing data in each macroblock as a function of a set data rate;

modifying said quantizing step as a function of motion information consisting of estimated or calculated motion of a macroblock of the current picture with respect to a matched macroblock of a preceding or following picture, and corrected by a value corresponding to a difference between average motion estimated for sequences with a high degree of movement and the average motion in the picture to which the macroblock belongs; and wherein said modifying is performed by multiplying a quantizing value calculated for the macroblock by a temporal adjustment coefficient equal to the modulus of a motion vector corresponding to motion averaged over a window of size w, divided by the modulus of a motion vector averaged over the complete picture.

5. Method according to claim 4, wherein data in each macroblock comprise discrete cosine transform coefficients of picture blocks.

* * * * *